April 17, 1962   H. A. FLETCHER   3,029,513
TELESCOPIC DENTAL SIPHON
Filed Oct. 29, 1958

INVENTOR.
HAROLD A. FLETCHER
BY
ATTORNEY

United States Patent Office 3,029,513
Patented Apr. 17, 1962

3,029,513
TELESCOPIC DENTAL SIPHON
Harold A. Fletcher, 629 Country Club Lane,
Havertown, Pa.
Filed Oct. 29, 1958, Ser. No. 770,337
2 Claims. (Cl. 32—33)

This invention relates generally to a siphon, and is especially concerned with a siphon for use in dental operations for removing saliva from a patient's mouth.

As is well known to those versed in the art, dental siphons are intended to effect the removal of saliva from a patient's mouth to make the patient more comfortable and facilitate performance of the dentist's task. However, prior dental siphons have not been entirely satisfactory in that they are often not comfortable in lacking adjustability to fit different oral cavities, the salvia removal function often being impaired by the action of suction drawing the patient's tissues into closing relation with the siphon, and further by obstructing the dentist's hand and tools in the performance of the dental operation.

Accordingly, it is an object of the present invention to provide a dental siphon which overcomes the above mentioned difficulties, is capable of wide adjustment for comfortable reception in oral cavities of widely diverse shapes and sizes, which is extremely quiet in its siphoning operation, effectively prevents clogging of the fluid passageways by tissues of the oral cavity, and which is adapted to be firmly retained in position in the patient's mouth, occupying a minimum of space therein, so as to form no obstacle to the dentist's operation.

It is a further object of the present invention to provide a dental siphon of the type described, having the advantageous characteristics mentioned in the preceding paragraph, which is extremely simple in construction, entirely reliable and durable in operation, and which can be manufactured and sold at a reasonable cost.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

Figure 1:
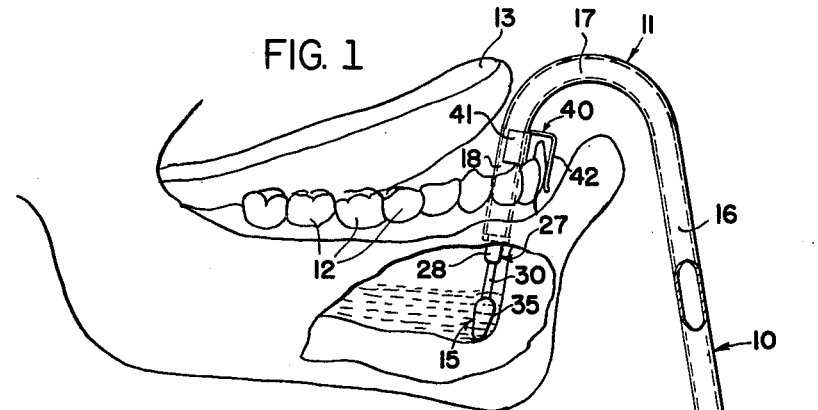
FIGURE 1 is a side elevational view, partly broken away, illustrating a dental siphon of the present invention in operative condition of use in a patient's mouth.
Figure 4:
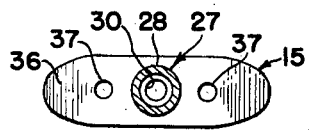
FIGURE 4 is a sectional view taken substantially along the line 4—4 of FIGURE 2.
Figure 2:
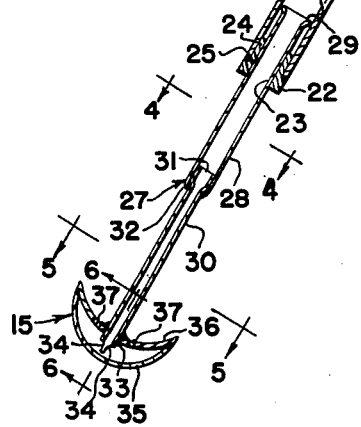
FIGURE 2 is a side elevational view showing the dental siphon apart from the patient's mouth, somewhat enlarged and partly in section for clarity of understanding.

Referring now more particularly to the drawings, and specifically to FIGURES 1 and 2 thereof, the dental siphon is there generally designated 10, and includes a tubular assembly, generally designated 11, of inverted, approximate U-shaped configuration. One end of the tubular assembly 11 is adapted to enter the patient's mouth, passing over the lower teeth 12 and depending beneath the patient's tongue 13, see FIGURE 1. On the depending end of the tubular assembly 11 interiorly of the patient's mouth is a head, generally designated 15 adapted to conformably seat in a lower region of the oral cavity.

The tubular assembly 11 includes a main tube 16 having a bend or bight portion 17, from which extend legs 18 and 19 at approximately a 50 degree angle with respect to each other. The leg 19 of the main tube 16 is substantially longer than the other leg 18 of the main tube, and is provided on its distal end with a ferrule 20, or other suitable means for connection in fluid communication with a vacuum source.

On the other, shorter leg 18 of the main tube 16, at the distal end thereof, is a plug 22 having a through bore 23, and formed with an externally reduced end portion 24 defining an annular external shoulder 25. The plug is arranged with its reduced portion 24 forcibly fit into the distal end portion of the main tube leg 18, preferably with the shoulder 25 abutting against the end edge of the leg 18.

Connected to the distal end of leg 18 by the plug 22 is a tubular, telescopic extension 27. In particular, the telescopic extension 27 includes an outer or larger, tubular section 28 having one end extending slidably inward through the bore 23 of plug 22 in substantial alignment with the leg 18 of the main tube 16, and interiorly of the latter leg, the tubular section 28 is flared, as at 29 to prevent its withdrawal from the plug 22 outward of the leg 18. The telescopic extension 27 includes an additional, inner or smaller tubular section 30 having its longitudinally inner and extending slidably inward through the longitudinally outer end of the larger section 28. Further, the inner end of section 30 is slightly enlarged, as at 31, while the outer end of the section 28 is slightly turned or rolled in, as at 32, the section end portions 31 and 32 being abuttingly engageable with each other to prevent longitudinally outward withdrawal of the section 30 from the section 28.

Figure 5:
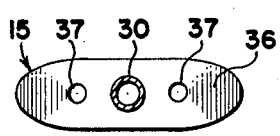
FIGURE 5 is a sectional view taken substantially along the line 5—5 of FIGURE 2.
Figure 6:
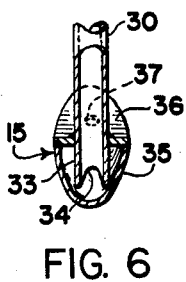
FIGURE 6 is a sectional view taken substantially along the line 6—6 of FIGURE 2.
Figure 3:
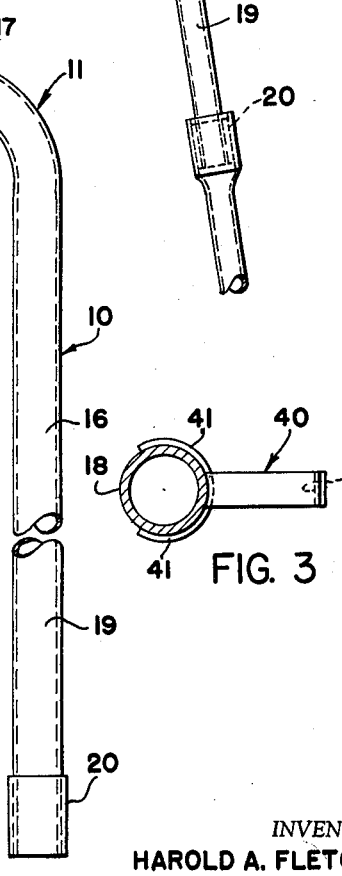
FIGURE 3 is a sectional view taken substantially along the line 3—3 of FIGURE 2.

On the outer end of the smaller section 30 is fixedly secured, as by soldering, welding or the like, the head 15. The head is best seen in FIGURES 2, 5 and 6 as including a hollow body 35 of generally crescent-shaped longitudinal cross section, see FIGURE 2, and of generally U-shaped transverse cross section, see FIGURE 6. Thus, the hollow body 35 may be considered as a crescent-shaped segment removed from an oblate or flattened spheroid. The body 35 thus defines an externally convex part of the head 15, which is lowermost of the head; and, an externally concave plate 36 of an ovaloid developed shape is fixedly secured by any suitable means extending entirely across the upper side of the body 35 and coextensive with the latter. The lower end of the smaller tubular section 30 is fixedly secured by any suitable means centrally to the plate 36, and projects through the latter, as at 33, into the interior of the head 15, having opposed cutouts 34 spaced longitudinally of the head. Thus, the head 15 is adjustable toward and away from the leg 18 upon telescopic operation of the sections 28 and 30. Also formed in the plate 36 are a pair of through apertures or ports 37 located on opposite sides of the tube section 30, spaced longitudinally of the head 15 and located closely adjacent to the latter tube section. Thus, the ports 37 communicate from the ambient surroundings with the interior of the head 15, which in turn communicates through the telescopic extension 27 to the interior of the main tube 16.

As best seen in FIGURE 1, the telescopic section 27 depends from the lower end of leg 18 on the inner side of the teeth 12 to the lower interior region of the patient's mouth; and there seats comfortably with the smooth concave external surface of the head 15 engaging the oral tissues. It will be noted that the crescent-like configuration of the head 15, and the location of the ports 37 in the concave upper side of the head serves to place the ports out of possible engagement with the internal oral tissues to prevent their being clogged or closed by the tissues.

In order to more firmly position the siphon 10 relative to the mouth, a rest or support 40 is carried by the leg 18 and engageable over the lower teeth 12 of the patient. In particular, the rest or support 40 includes a clip part 41 of interrupted circular configuration adapted to frictionally embrace the leg 18, and an arm 42 projecting from the clip laterally outward away from the leg, and thence depending along the leg. The clip 41 is slidably adjustable and frictionally retained in any selected position along the leg 18, while the arm 42 is engageable over the patient's lower teeth. By this construction, adjustability of the siphon in the patient's mouth is augmented, while the siphon is effectively held against movement in the mouth. The device may thus be considered as having automatically self-adjusting double swivel action.

Although the present invention has been described in some detail by way of illustration and example for purposes of clarity of understanding, it is understood that certain changes and modifications may be made within the spirit of the invention and scope of the appended claims.

What is claimed is:

1. A siphon for dental use comprising a main tube having an arcuate intermediate portion adapted to enter a patient's mouth extending over the lower teeth and having one end depending from said intermediate portion beneath the patient's tongue, the other end of said main tube depending from the patient's mouth exteriorly thereof for connection to a source of vacuum, at least one telescopic extension tube projecting longitudinally from said one end of said main tube and connected to the latter for free rotary and extensile and retractile movement with respect thereto for depth-wise adjustment of its distal end in the patient's mouth, abutment means on said main tube and telescopic extension tube limiting extensile movement of the latter, and a hollow head having the configuration of a crescent shaped segment of an oblate sphere and connected on the distal end of said telescopic extension tube, said head having its convex side downward for comfortable seating in the patient's mouth and having its concave side upward and connected centrally to the distal end of and in symmetrical relationship with said telescopic extension tube for vertical and rotary movement with the latter, said head, telescopic extension tube and main tube being in fluid communication with each other, there being formed in the concave side of said head at least one inlet port for passing saliva to said head and thence through said extension tube and main tube, the distal end of said telescopic extension tube depending into said head through the upper side thereof and terminating proximate to and spaced from the lower internal surface of said head.

2. A siphon for dental use comprising a main tube having an arcuate intermediate portion adapted to enter a patient's mouth extending over the lower teeth and having one end depending from said intermediate portion beneath the patient's tongue, the other end of said main tube depending from the patient's mouth exteriorly thereof for connection to a source of vacuum, at least one telescopic extension tube projecting longitudinally from said one end of said main tube and connected to the latter for rotary and extensile and retractile movement with respect thereto for depthwise adjustment of its distal end in the patient's mouth, abutment means on said main tube and telescopic extension tube limiting extensile movement of the latter, a hollow head having the configuration of a crescent-shaped segment of an oblate sphere and connected on the distal end of said telescopic extension tube, said head having its convex side downward for comfortable seating in the patient's mouth and having its concave side upward and connected centrally to the distal end of and in symmetrical relation with said telescopic extension tube for vertical and rotary movement with the latter, said head, telescopic extension tube and main tube being in fluid communication with each other, there being formed in the concave side of said head at least one inlet port for passing saliva to said head and thence through said extension tube and main tube, a rest member projecting from said main tube between said one end portion and said one end thereof for supporting engagement with the patient's lower teeth, and a clip on said rest member in frictional embracing engagement with said main tube for releasably retaining said rest member in any selected position along said main tube.

References Cited in the file of this patent

UNITED STATES PATENTS

| | | |
|---|---|---|
| 730,128 | Jordon | June 2, 1903 |
| 1,184,922 | Brownton | May 30, 1916 |
| 1,362,601 | Chandler | Dec. 21, 1920 |
| 2,005,625 | La Riche | June 18, 1935 |
| 2,161,151 | Freedman | June 6, 1939 |
| 2,274,893 | Freedman | Mar. 3, 1942 |
| 2,603,870 | Nordin | July 22, 1952 |

FOREIGN PATENTS

| | | |
|---|---|---|
| 501,877 | Germany | July 5, 1930 |